(12) United States Patent
Baumer et al.

(10) Patent No.: US 8,346,588 B2
(45) Date of Patent: Jan. 1, 2013

(54) DYNAMIC RESOURCE AVAILABILITY PROCESS

(75) Inventors: Michael J. Baumer, Louisville, KY (US); Thomas D. Hammack, Georgetown, IN (US); Karthik Kulavalli, Louisville, KY (US); Regi Luke, Louisville, KY (US)

(73) Assignee: General Electric Company, Schenectady, NY (US)

(*) Notice: Subject to any disclaimer, the term of this patent is extended or adjusted under 35 U.S.C. 154(b) by 1307 days.

(21) Appl. No.: 11/735,081

(22) Filed: Apr. 13, 2007
(Under 37 CFR 1.47)

(65) Prior Publication Data
US 2008/0059270 A1    Mar. 6, 2008

Related U.S. Application Data

(63) Continuation-in-part of application No. 10/134,251, filed on Apr. 26, 2002, now abandoned.

(60) Provisional application No. 60/368,630, filed on Mar. 28, 2002.

(51) Int. Cl.
*G06Q 10/00* (2012.01)
(52) U.S. Cl. .................................................... 705/7.14
(58) Field of Classification Search .............. 705/9, 7.14
See application file for complete search history.

(56) References Cited

U.S. PATENT DOCUMENTS

| 6,134,530 | A | 10/2000 | Bunting et al. |
| 6,240,362 | B1 | 5/2001 | Gaspard et al. |
| 7,257,552 | B1 * | 8/2007 | Franco .................... 705/28 |
| 2001/0005831 | A1 | 6/2001 | Lewin et al. |
| 2001/0011225 | A1 | 8/2001 | O'Connor et al. |
| 2001/0047285 | A1 | 11/2001 | Borders et al. |
| 2001/0049619 | A1 | 12/2001 | Powell et al. |
| 2002/0035493 | A1 | 3/2002 | Mozayeny et al. |
| 2002/0065700 | A1 | 5/2002 | Powell et al. |
| 2002/0107716 | A1 * | 8/2002 | Callahan et al. ........... 705/9 |
| 2008/0162242 | A1 * | 7/2008 | Schneur et al. ............ 705/9 |

OTHER PUBLICATIONS

"PointServe Launches Breakthrough On-Line Scheduling Solutions to Dramatically Improve the Reliability of Home and Business-Oriented Service Delivery Regional Rollout to Begin in Salt Lake City on Nov. 1." PR Newswire, ID No. 45806204, p. 1, Oct. 26, 1999.*

"PointServe Launches Breakthrough On-Line Scheduling Solutions to Dramatically Improve the Reliability of Home and Business-Oriented Service Delivery Regional Rollout to Begin in Salt Lake City on Nov, 1." PR Newswire, ID No. 45806204, p. 1, Oct. 26, 1999.

* cited by examiner

*Primary Examiner* — Susanna M Meinecke Diaz
(74) *Attorney, Agent, or Firm* — Global Patent Operation; Douglas D. Zhang (57) ABSTRACT

A computational network system that permits service a group of technicians access to the manufacturer network to provide their work capacity and availability for a specific area. A customer contacts the manufacturer via the computational network system, requesting a service call. Service call request processing results in assigning a service request/demand to a technician based on their qualifications, availability, and proximity. When a service technician is assigned, their availability is decremented. Cancellation of a service call yields an increment in the affected service provider's availability. This information is stored in a in an on-line database residing in the network system. Updates are dynamically reflected as they occur resulting in automated schedule administration of a customer's service requests/demands.

11 Claims, 7 Drawing Sheets

Resource Allocation Matrix

Date: mm/dd/yy – Monday

|  | Tech 1 (All) | Tech 2 (All) | Tech 3 (GE) |
|---|---|---|---|
| Morning | Assignment | Assignment | Assignment |
| Morning | Assignment | Assignment | Assignment |
| Morning | Assignment | Assignment | Assignment |
| Afternoon | Assignment | Assignment | Assignment |
| Afternoon | Assignment | Available | Available |
| Afternoon | Assignment | Available | Available |
| All Day | Assignment | Available | Assignment |
| All Day | Available | Available | Assignment |

Capacity = 8  
Load = 7  
Availability = 1

Capacity = 8  
Load = 4  
Availability = 4

Capacity = 8  
Load = 6  
Availability = 2

Figure 1

System Diagram

Dynamic Group Availability Processing

Figure 5

Capacity Processing

Figure 6

Demand Processing

Figure 7

DYNAMIC RESOURCE AVAILABILITY PROCESS

CROSS REFERENCE TO RELATED APPLICATIONS

This application claims the benefit of U.S. provisional application 60/368,630 filed on Mar. 28, 2002, and is a continuation in part of U.S. application Ser. No. 10/134,251, filed on Apr. 26, 2002 now abandoned, the contents of each incorporated by reference herein in their entirety.

FIELD OF THE INVENTION

This invention relates in general to a method for automating the administration of customer service calls. More particularly, this invention relates to a method for process automation of customer service scheduling based service requirements and known qualified service technician allocation.

BACKGROUND OF THE INVENTION

A typical process to obtain product service begins when a customer contacts a manufacturer requesting a service call. The manufacturer obtains pertinent data for the service call requested. The manufacturer assigns the service call request to a qualified technician from their independent server network (i.e., service provider), which consists of a pool of qualified/certified technicians that service products (i.e., goods) for designated areas. The manufacturer contacts the assigned service technician and relays pertinent information regarding the service call. Upon receiving a service call assignment, the technician must contact the customer promptly and schedule an appointment. This disjointed approach does not permit the manufacturer to schedule service calls directly with the customer due to the lack of service provider workload capacity and availability information.

It is desirable to have the capability of scheduling a service request during initial contact with the customer since a manufacturer's reputation for fast, efficient, quality service can be a deciding factor when purchasing a product, such as an appliance. There also exists a need in the art to automate the administration of service calls in order to streamline the process, enhance customer satisfaction, and eradicate technician-scheduling activities. Automation of this process would increase technician productivity yielding a reduction in service costs realized by the manufacturer.

In view of the foregoing issues, it is desirable to enhance customer satisfaction by automating the administration of service calls. It is further desirable to establish the capability for the manufacturer to schedule a service call request based on known service technician availability during initial contact with the customer. It is also desirable to increase the productivity of service provider by eliminating their task of scheduling a service call with a customer.

BRIEF SUMMARY OF THE INVENTION

The disclosed invention allows independent service providers to report and update their workload capacity to the manufacturer in an integrated fashion enabling customer service request scheduling automation. Customers and independent service providers remotely communicate with the manufacturer's computerized network to establish access and support for process automation. The service provider inputs their daily workload capacity and schedule information into the system thus informing the manufacturer of their availability to service calls. The customer inputs their service requirements including a preferred appointment time known as a customer service request/demand.

The dynamic group availability processor determines the appropriate service provider assignment upon comparing the customer service demand with the availability of service providers. Upon assigning the customer service demand to the appropriate service provider, confirmation is provided to the customer and the assigned service provider is notified of the scheduled appointment. If the customer's initial selection of a desired appointment time cannot be supported due to lack of service provider availability, alternative time periods are provided for the customer to choose from. The service provider associated with the customer chosen time period is assigned the appointment.

Upon assigning a service provider an appointment, the workload capacity of the selected service provider is decremented and updates reflected in the on-line database. Cancellation of a service call appointment yields an increment in the affected service provider's availability.

BRIEF DESCRIPTION OF THE DRAWINGS

The present invention may be understood by referring to the following description and accompanying drawings.

DETAILED DESCRIPTION OF THE INVENTION

A group of independent service providers is comprised of sub-groups that are part of a manufacturer's independent service network where certification and qualifications of service providers vary. This independent service network is designated to service specified geographical areas for customer service call requests received by a manufacturer. The manufacturer receives service call requests from their customers possessing a guarantee, warranty, or other contract type. These customers are purchasers of products/goods fabricated by the manufacturer. A customer can also be a purchaser of a contractual agreement with the manufacturer to service other products/goods not produced by the manufacturer.

The invention disclosed allows independent service providers (i.e., service technicians) to report their workload capacity to the manufacturer. Workload capacity is the quantity of service requests a technician is capable of completing within a specific period of time. The independent service provider supplies the manufacturer with their standard schedule capacity. The standard schedule capacity consists of the quantity of service calls the service provider can support. Support is supplied for each day of the week. For example, on Monday a particular independent service provider can support a capacity of ten service calls, on Tuesday the service provider can support the capacity of eight service calls, etc.

Figure 1:
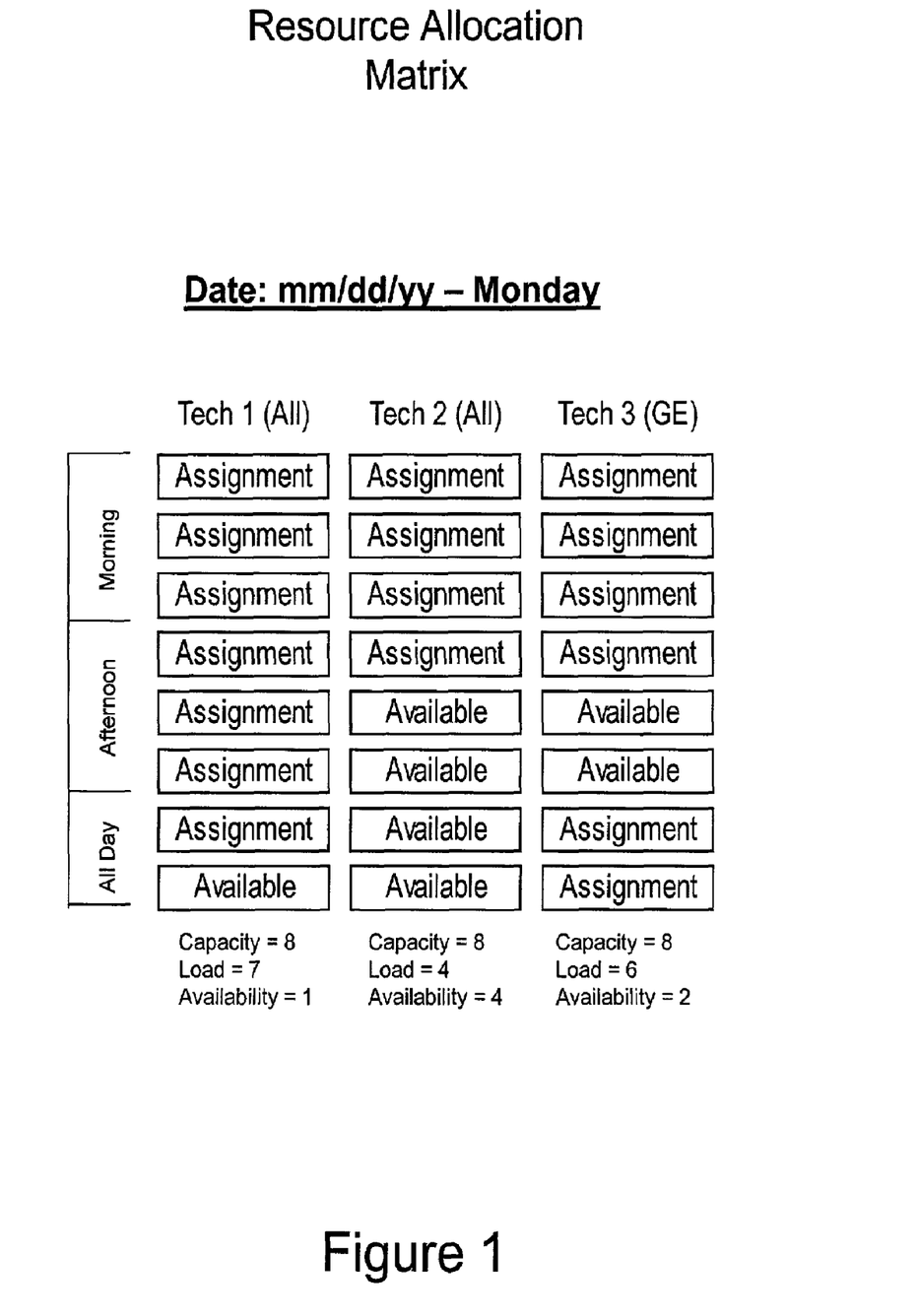
FIG. 1 is a sample of a resource allocation matrix.

An example of work capacity for a specific day is provided in the resource allocation matrix depicted in FIG. 1 where "mm/dd/yy" defines the month, day, and year respectively. This matrix segments the workday into predetermined periods, which span hours and/or minutes. Multiple periods can be defined to cover various portions of the day. As depicted in this example, there are three periods the customer can select from as defined in the following:

Period 1 consists of morning hours spanning from 8 a.m. until noon.

Period 2 consists of the afternoon hours spanning from 1 p.m. to 5 p.m.

Period 3 represents the entire workday, which spans from 8 a.m. to 5 p.m.

It is to be understood that these are examples, and that more or less than three periods can be provided (e.g., Periods 1 and 2, or Periods 1-4), and/or that the periods can cover different intervals and/or different numbers of hours (e.g., Period 1 can extend from 8 a.m. until 11 a.m., while Period 2 extends from 11 a.m. to 5:30 p.m.).

Service providers select which periods best fit their businesses and reflect this in their standard schedule capacity of workload. If the independent service provider has exceptions to their standard schedule capacity of workload, they reflect these exceptions by modifying their capacity for the effected period(s) of time. The exception capacity overrides their standard schedule capacity.

In the example of FIG. 1, three technicians have a workload capacity of eight service requests per day. Each normally supports three "morning", three "afternoon", and two "all day" customer service requests. Qualifications of the three technicians vary.

Tech 1 and Tech 2 service all product types supported by the manufacturer. Tech 3 is certified to service GE products. The manufacturer designates a customer service request to an independent service provider resulting in an assignment for the selected technician. The quantity of service requests assigned to a technician for a specific date and period is the load. Each assigned service request is one load unit regardless of its being completed or pending completion status. The service provider's load is affected by cancellation or reassignment of service requests.

Availability is the difference between an independent service provider's capacity and load. Availability varies as a technician's load changes. Changes are reflected dynamically in the resource allocation matrix as updates are received. This example indicates the following workload allocation for three service providers (i.e., Tech) on the particular day defined in this example:

Tech 1 has seven assignments and is available for an All Day Assignment,

Tech 2 has four assignments and is available for Afternoon or All Day Assignments, and Tech 3 has six assignments and is available for Afternoon assignments.

It is to be understood that these are examples, and that more or less than three Techs can access the system (e.g., Techs 1 and 2, or Techs 1-4), and that one or more of the Techs can be available for a different maximum number of assignments than the other Techs, and that the maximum number of assignments on any given day and/or the times of the assignments on any given day can vary.

Figure 2:
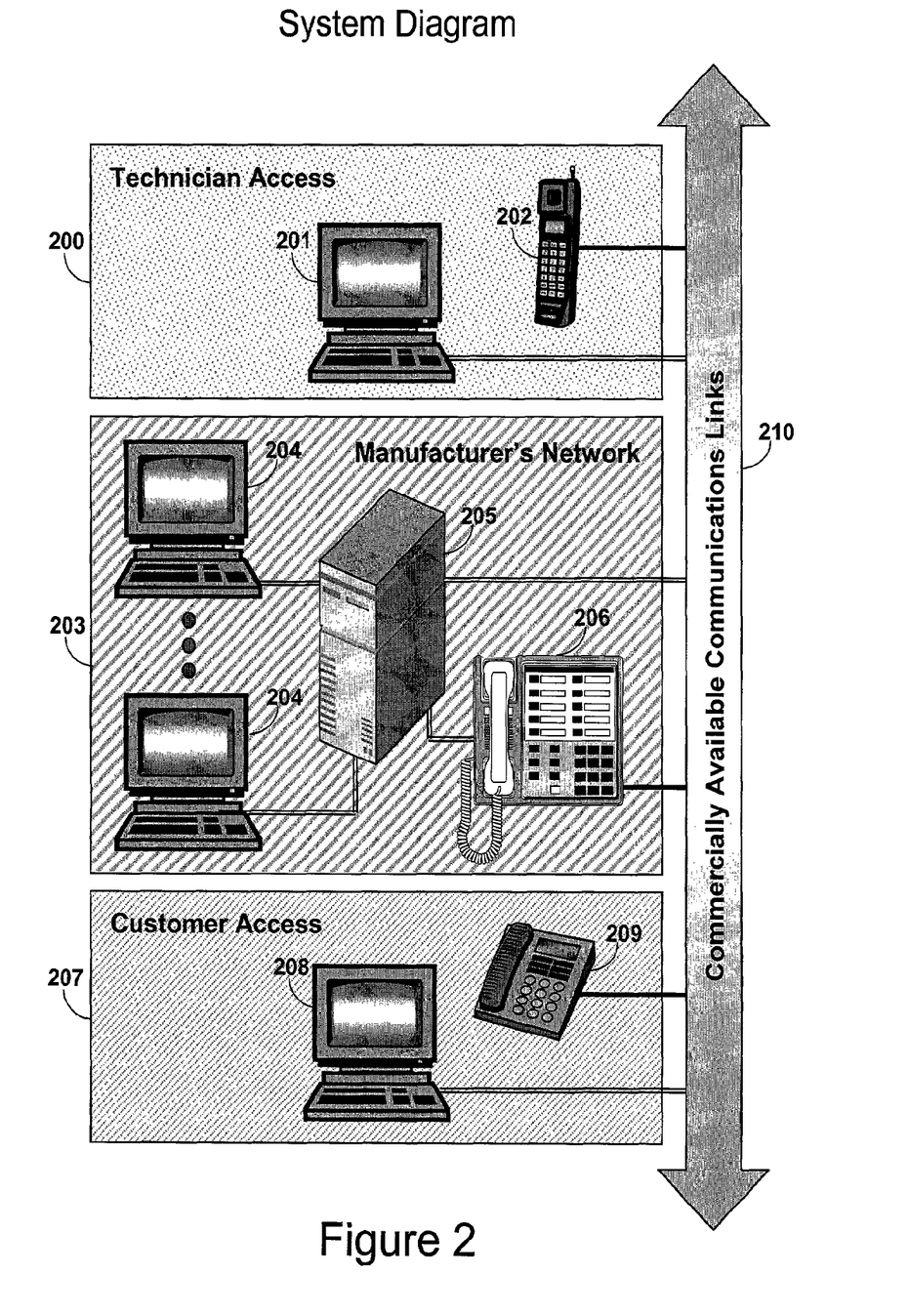
FIG. 2 is an exemplary system diagram for the disclosed invention.

The system architecture of an exemplary embodiment for the disclosed invention is provided in FIG. 2. This architecture supports remote independent server provider access 200 to the manufacturer's network 203 via commercially available communications links 210. Commercially available links include but need not limited to the Internet and telephony communication links. Independent server providers can establish remote access to the manufacturer's network 203 via an Internet connection using a computer system 201. Independent service providers can also establish remote access to the manufacturer's network 203 via a telephony device 202, which interfaces with the manufacturer's Private Branch Exchange (PBX) 206 System. Independent server providers utilize these communications to report and maintain their workload capacity. The manufacturer's network 203 consists of a server 205, multiple computer systems 204, and the manufacturer's PBX system 206. The PBX system 206 is integrated into the manufacturer's server 205 in order to share and update data accordingly. In this exemplary embodiment, the manufacturer's server 205 supports the dynamic group availability processing and data storage requirements (i.e., the on-line database). Remote customer access 207 is also established via a computer system 208 or a telephony device 209. Other examples of communications means that could be utilized to support remote communications with the manufacturer's network could include but are not limited to devices such as a wireless personal digital assistant (PDA), an Internet Appliance, or devices that utilize Short Message Services (SMS).

Figure 3:
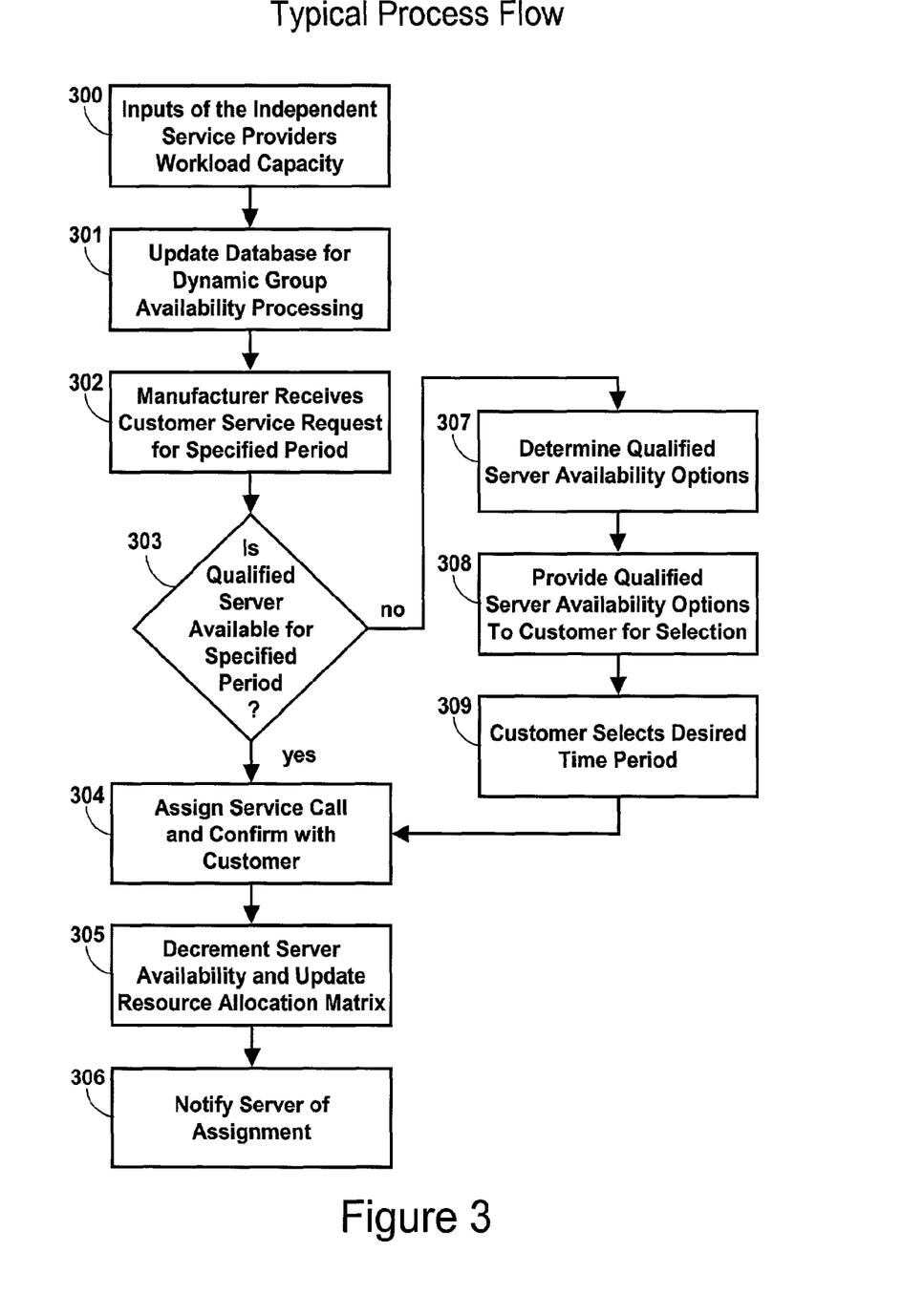
FIG. 3 is a typical process flow for the disclosed invention.

Typical processing for the disclosed invention depicted in FIG. 3 begins with independent service providers accessing the manufacturer's network 203. Upon access, they provide inputs of their workload capacity 300 into the dynamic group availability processing system. Upon receiving independent service provider inputs (e.g., updates of periodic progress, standard schedule capacity, and/or exceptions to workload capacity), the dynamic group availability processor updates its on-line database 301. This establishes the capability of the manufacturer to readily schedule customer service requests with a qualified, available independent service provider. Now, the process becomes event-driven. Upon a customer contacting the manufacturer to request service for a specified period 302, the dynamic group availability processor accesses the resource allocation matrix (i.e., the on-line database) to determine if a qualified service provider is available for the specified time 303. If a qualified service provider is available, the customer service request is assigned to this resource and a confirmation of the service request appointment is provided to the customer 304. The selected service provider's availability is decremented, load is incremented for the appropriate unit(s), and the resource allocation matrix is dynamically updated 305 to reflect these changes. The dynamic group allocation processing then notifies the service provider of their new assignment 306 providing pertinent information to fulfill the service call. If however, the dynamic group availability processor accesses the resource allocation matrix (i.e., online database) and determines that a qualified service provider is not available for the specified period indicated by the customer 303, then another time period must be selected. Therefore, the dynamic group availability processor accesses the resource allocation matrix data and determines the availability options 307 of qualified service providers. These options are presented to the customer 308. The customer selects a desired time period preference from the options presented 309. Then, the customer service request is assigned to the qualified service provider associated with the time period availability selected and the service request appointment is confirmed 304. The selected service provider's availability is decremented, load is incremented for the appropriate unit(s), and the resource allocation matrix is dynamically updated 305 to reflect these changes. The dynamic group allocation processing then notifies the service provider of their new assignment 306 providing pertinent information needed to fulfill the service call.

Figure 4:
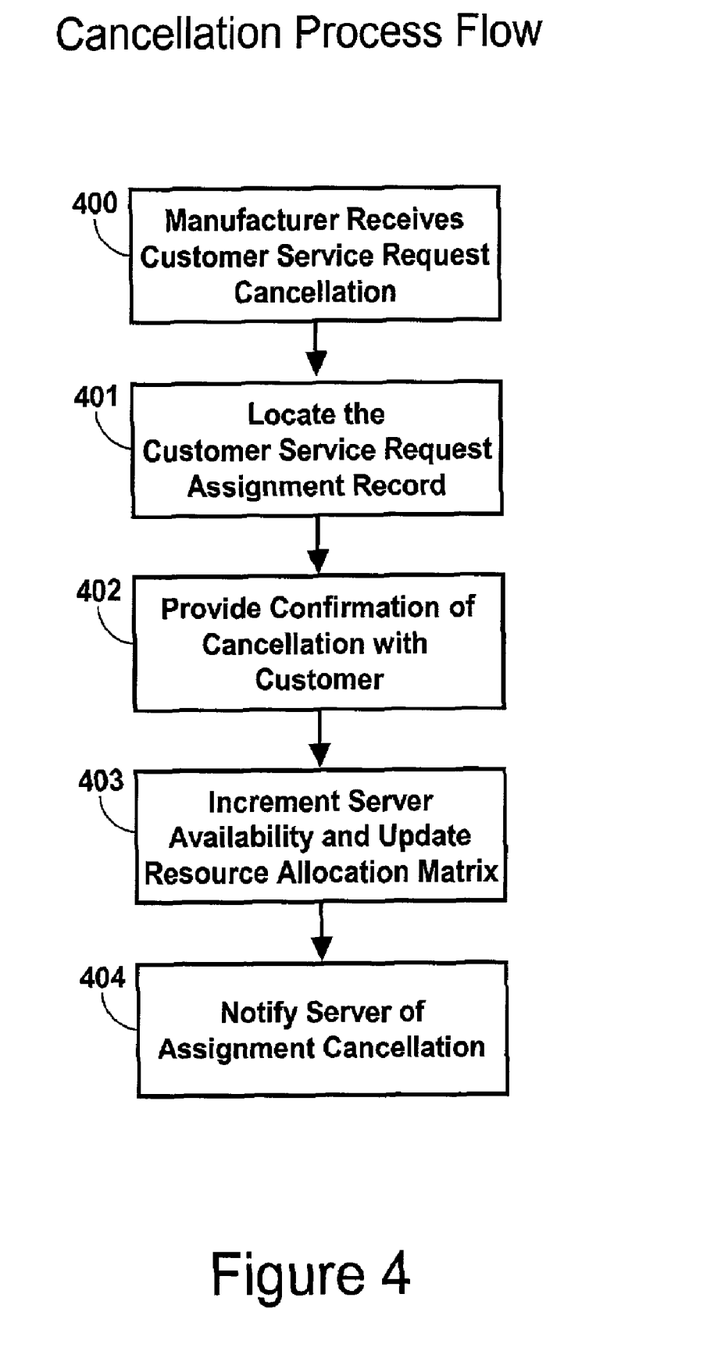
FIG. 4 is a flow diagram depicting the customer appointment cancellation process.

The process flow of FIG. 4 supports the event of a manufacturer receiving notification from a customer who desires to cancel a scheduled service call 400. The service request assignment record is located in the on-line database 401 and a cancellation confirmation is presented to the customer 402. The assigned service provider's availability is incremented and their load decreased by the appropriate unit(s), which is reflected in updates to the resource allocation matrix 403. The assigned service provider is notified of the assignment cancellation 404.

Figure 5:
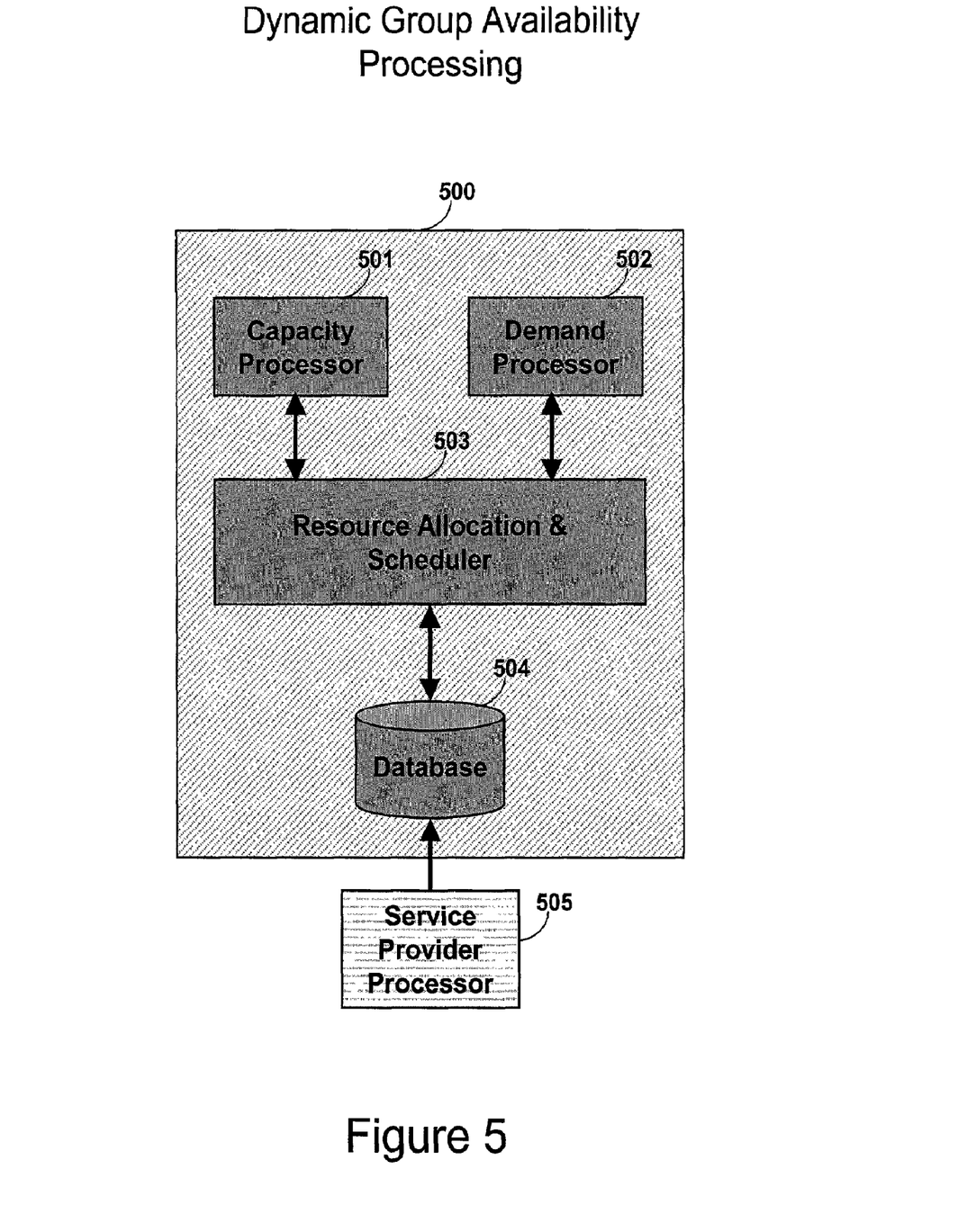
FIG. 5 is a block diagram of the dynamic group allocation processing system.

In this exemplary embodiment, the manufacturer's server 205 supports the primary dynamic group availability processing 500 functions portrayed in FIG. 5. The dynamic group availability processor 503 schedules a service provider based on capacity processor 501 and demand processor 502 inputs. Capacity processor 501 inputs are achieved in the on-line database 504. The on-line database retains capacity data utilized to schedule customer service appointments. Data stored in the on-line database 504 in this exemplary embodiment includes the following:

Pertinent customer demand information necessary for the service provider to fulfill the assignment such as defined below:
  Date
  Customer name
  Customer address and zip code
  Customer phone number
  Brand of product to service
  Product line
  Model number
  Problem report
  New or iterative problem
  Service contract information The resource allocation data for area(s) of coverage are represented in FIG. 1.

Appointment status data (e.g., pending, completed, cancelled).

Tracking numbers (e.g., record locator number, confirmation numbers) Technician selection information (e.g., quality of service data, certifications, qualifications). The service provider processor 505 supplies this data.

The service provider processor 505 is an off-line process the manufacturer utilizes to incorporate and maintain independent service provider selection criteria such as relative quality of service scoring, performance history, and certification data. For example, Consumer A prefers a service appointment for a Whirlpool washer on Monday afternoon. In reference to the resource allocation matrix shown in FIG. 1, Tech 1 is not available. Tech 2 and Tech 3 are available but Tech 3 is only certified to service GE products. Therefore, the service request gets assigned to Tech 2 for an afternoon appointment.

Another example of independent service provider selection with reference to FIG. 1 examines the case where Consumer B prefers a service appointment for a GE washer on Monday morning. No service providers are available during this period of time. Tech 2 and Tech 3 are available in the afternoon. All service providers are available for all day. Therefore, the consumer is offered the following choices to schedule a service request appointment:
  Monday afternoon
  All day Monday
  Tuesday morning
  Wednesday morning
  All day Wednesday Consumer B chooses an afternoon appointment for Monday. Tech 1 is not available. Tech 2 and Tech 3 are both available. Tech 3 specializes in GE products. Hence, Tech 3 is assigned the customer service call.

Figure 6:
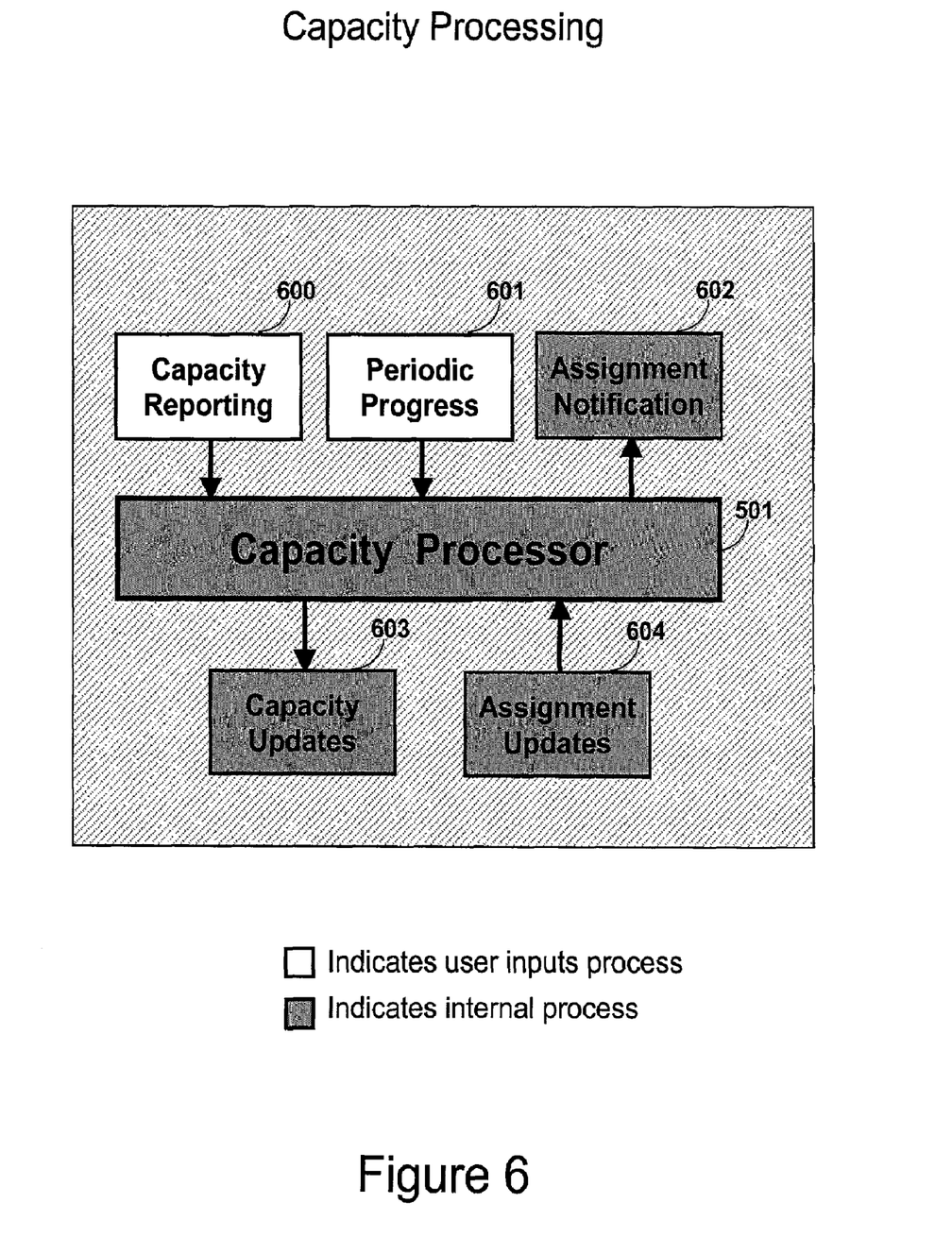
FIG. 6 is the capacity processor functional block diagram.

FIG. 6 further details the capacity processor 601, which is the interface utility that supports service provider requirements. This exemplary embodiment consists of the service provider interface being implemented as a client web page that is remotely accessed via an Internet connection over commercially available communication links 210. An alternative implementation could be a menu-driven user interface accessed via telephony communications leveraging the manufacturer's PBX system 206. The interface supplied by the capacity processor accommodates the service provider capacity reporting 600 inputs, periodic progress 601 inputs, and notification from the manufacturer to the service provider of new assignments 602. Capacity reporting 600 provides the functionality for the service provider to input their standard schedule capacity and any exceptions. These inputs are sent as capacity updates 603 to the resource allocation & scheduler 503 to be reflected in the resource allocation matrix data stored in the on-line database 504. As assignments are designated for a particular service provider by the resource allocation and scheduler processor 503, assignment updates are sent to the capacity processor 604 to notify the service provider of their assignment 602. Upon assignment allocation to the service provider, the particular service provider's capacity is decremented. This decrement is reflected in an update of the resource allocation matrix. Assignment notification 604 includes pertinent information necessary for the service provider to fulfill the assignment. Implementation of the assignment notification 602 could support an alarm to alert a service provider of reception of a new assignment.

Figure 7:
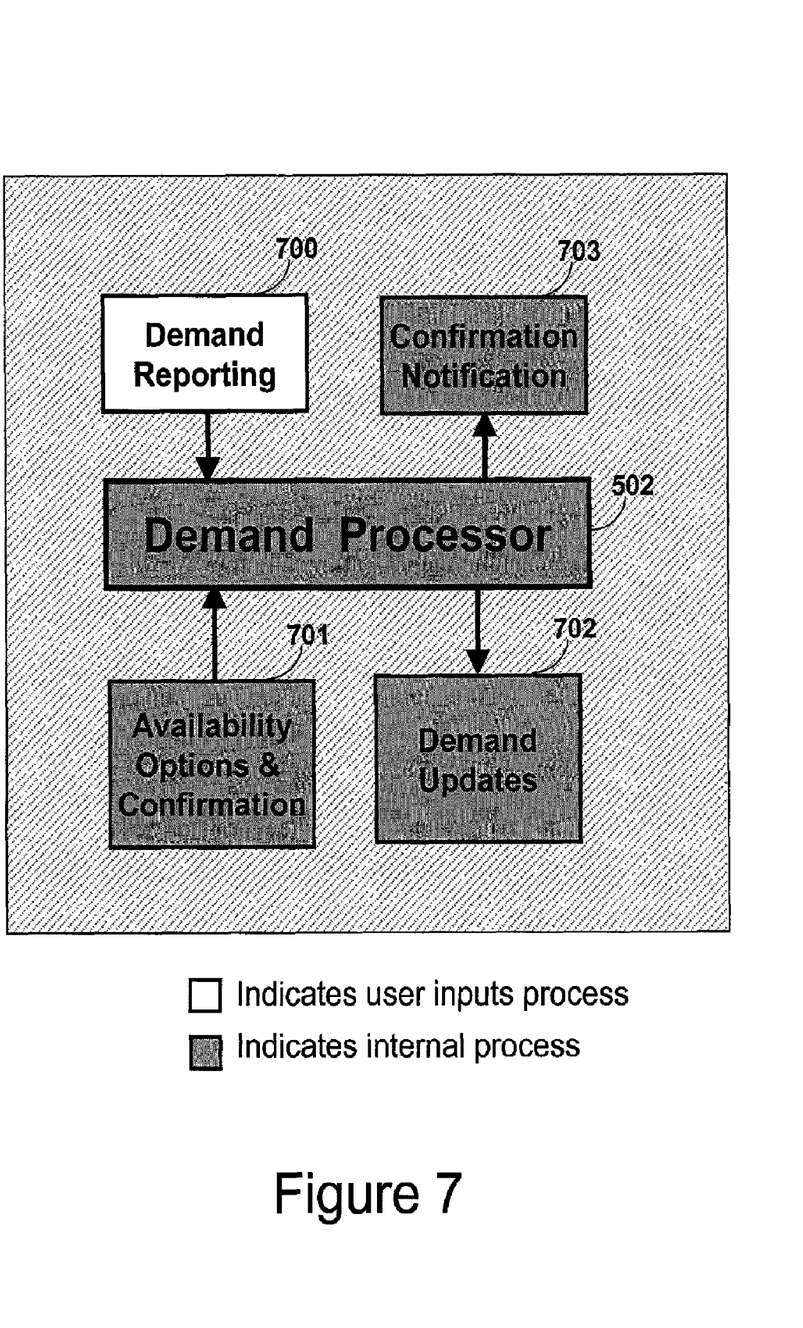
FIG. 7 is the demand processor functional block diagram.

The demand processor depicted in FIG. 7 supports the customer interface functions. This exemplary embodiment consists of the customer interface being implemented as a client web page that is remotely accessed via an Internet connection over commercially available communication links 210. An alternative implementation could be a menu-driven user interface accessed via telephony communications leveraging the manufacturer's PBX system 206. Upon a customer accessing the manufacturer network 203, they can place a service request known as the demand reporting 700. Demand reporting 700 supplies pertinent information necessary for the manufacturer to determine contractual requirements, schedule the service request, and fulfill the service call. Upon a customer successfully indicating a request for service 700 by providing pertinent data, demand updates 702 are sent to the resource allocation and scheduler 503. This data includes a customer specified service time period. The resource allocation and scheduler determines if the customer's desired appointment time can be fulfilled (i.e., if a qualified service provider is available to service the customer request at the specified time period). If the desired appointment time can be fulfilled, the available technician is assigned the service call and confirmation notification 701 is readily provided to the consumer. If no service technicians are available for the specified time period, the resource allocation and scheduler 503 will determine other time period options that are available and present those to the customer for selection 701. The customer will select the desired time period availability option via the demand reporting process 700 and demand updates 702 will be sent to the resource allocation and scheduler 503 where the selected option will be assigned to the associated service provider. A confirmation 703 of the assigned request will be provided to the customer.

It is understood that embodiments of the present invention provide numerous advantages over known service call request systems. In specific embodiments of the present invention, the manufacturer's network 203 is a system that is accessed by a plurality of separate, independent technicians, each of the technicians accessing the manufacturer's network 203 through their computer system 201 and/or telephony device 202. As a result, each customer can use their computer system 208 and/or telephony device 209 to access the single manufacturer's network 203, and have access to the service call times available from the plurality of separate, independent technicians. The convenience to each particular customer is enhanced, as each customer is more likely to schedule the service call at the time desired by them. Further, in embodiments of the invention, as discussed above, the single manufacturer's network 203 is used by customers owning appliances of different brands (e.g., GE, Whirlpool), and by technicians servicing one or more of the different brands (e.g., Tech 1 servicing all brands, Tech 3 servicing only GE). As a result, each technician can update the resource allocation matrix in the single manufacturer's network 203, and still service appliances of different brands. The particular technician is not required to update information regarding their ability to provide a service call, with multiple networks, such as a first network used by customers owning GE appliances, and a separate, second network used by customers owning Whirlpool appliances. The burden on each technician to update their availability is decreased, and each customer receives more accurate information regarding the technician's ability to provide the service call. Still further, each manufacturer (e.g., GE and Whirlpool) is not required to maintain their own network, as the single manufacturer's network 203 can be used to provide service to all brands of appliances.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

The invention claimed is:

1. A method for coordinating an availability of service providers to fulfill service requests of customers to service products of different types and brands by using a dynamic group availability processing system, the processing system comprising a processor and a database, the method comprising:
   receiving, in the processing system, service capacity data from each service provider, the service capacity data being indicative of a respective capacity of each service provider to deliver services for products of different types and brands over selectable periods of time;
   updating the database with the service capacity data, the database including area-coverage data indicative of at least one group of service providers assignable to serve customers over respective geographical areas;
   generating data indicative of individual service providers' availability over respective geographical areas and over each selectable period of time, the data including an availability and a load for each service provider determined from the service capacity data, the availability comprising a difference between a total capacity of the service provider and the load, the load comprising a quantity of assigned service requests;
   receiving, in the processing system, a service request from a customer for service of a product, the service request identifying a type and a brand of the product, wherein the brand of product of the customer is one of a first brand and at least a second brand different from the first brand, a geographical location of the product and a requested time for the service;
   determining, in the processor, if a service provider's service capacity data is indicative of the service provider's availability corresponding to the service request, the determination comprising comparing the type and brand of the product in the service request to types and brands of products serviced by each service provider, comparing the geographical location of the product to a geographical location of each service provider, and comparing a requested time for the service with a time availability of each service provider; and
   if a service provider's service capacity data indicates an individual service provider availability to service the first brand and the second brand corresponding to the service request, the processor is configured to:
      select the service provider and send an assignment update to notify the selected service provider of the service request; and
      inform the customer of the results of the selected service provider's availability;
      increment the load by one load unit for the selected service provider;
      calculate a new availability for the selected service provider; and
      update the database with the assignment update, the availability and the load in real-time without input from the selected service provider.

2. The method of claim 1, wherein if a service provider's service capacity data does not correspond to the service request, the method comprises:
   determining, from each service provider's capacity data, a time period when a service provider corresponding to the service request is available;
   receiving a selection of the time period from the customer;
   selecting the corresponding service provider;
   sending an assignment update to notify the selected service provider of the service request;
   incrementing the load by one load unit for the selected service provider;
   calculating a new availability for the selected service provider; and
   updating database with the assignment update, the availability and the load in real-time without input from the selected service provider.

3. The method of claim 1, when a service is scheduled, further comprising:
   receiving a request to cancel a scheduled service;
   wherein the processing system is configured to:
      locate, in the database, the assignment update;
      send a cancellation confirmation message to the customer and the selected service provider;
      decrement the load by one load unit for the selected service provider;
      calculate a new availability for the selected service provider; and
      update the database with the assignment update, the availability and the load in real-time without input from the selected service provider.

4. The method of claim 1, wherein the type of products comprises products of different brands.

5. The method of claim 1, wherein updating the database with the service capacity data occurs in real-time.

6. The method of claim 1, wherein the determination further comprises comparing availability and load of the service providers.

7. A system for coordinating an availability of service providers to fulfill service requests of customers to service products of different types and brands, the system comprising:
- a capacity processor configured to receive service capacity data from different service providers, the service capacity data being indicative of a respective capacity of each service provider to deliver services for products of different types and brands over selectable periods of time;
- a database including area-coverage data indicative of at least one group of service providers assignable to server purchasers over respective geographical areas, the database being communicative coupled to:
  - a demand processor configured to receive a service request from a customer for service of a product, the service request identifying a type and a brand of the product, wherein the brand of the product of the customer is one of a first brand and at least a second brand different from the first brand, a geographical location of the product and a requested time for the service;
  - a resource allocation and scheduler processor communicatively coupled to the capacity processor and the demand processor; and
  - a resource allocation matrix communicatively coupled to the resource allocation and scheduler processor, the resource allocation matrix storing the service capacity data,
  wherein the resource allocation and scheduler processor is configured to generate data indicative of individual service providers' availability to service the first brand and to service the second brand over respective geographical areas and over each selectable period of time by determining an availability and a load for each service provider from the service capacity data the availability comprising a difference between a total capacity of the service provider and the load, the load comprising a quantity of assigned service requests;
  wherein the resource allocation and scheduler processor is configured to relate the service request to the data indicative of a service provider's availability and determine if the service provider's service capacity data corresponds to the service request, the determination comprising comparing the type and the brand of the product in the service request to types and brands of products serviced by each service provider, comparing the geographical location of the product to a geographical location of each service provider, and comparing a requested time for the service with a time availability of each service provider; and
  if a service provider's service capacity data indicates an individual service provider availability corresponding to the service request, the resource allocation and scheduler processor is configured to:
    - select the service provider and send an assignment update to the capacity processor to notify the selected service provider of the service request;
    - increment the load by one load unit for the selected service provider;
    - calculate a new availability for the selected service provider; and
    - update the resource allocation matrix with the assignment update, the availability and the load in real-time without input from the selected service provider.

8. The system of claim 7, wherein if a service provider's service capacity data does not correspond to the service request, the resource allocation and scheduler processor is configured to:
- determine, from each service provider's capacity data, a time period when a service provider corresponding to the service request is available;
- receive a selection of the time period from the customer;
- select the corresponding service provider;
- send an assignment update to the capacity processor to notify the selected service provider of the service request;
- increment the load by one load unit for the selected service provider;
- calculate a new availability for the selected service provider; and
- update the resource allocation matrix with the assignment update, the availability and the load in real-time without input from the selected service provider.

9. The system of claim 7, wherein the demand processor is configured to receive a request to cancel a scheduled service, and the resource allocation and scheduler processor is configured to:
- locate, in the resource allocation matrix, the assignment update;
- send a cancellation confirmation message to the customer and the selected service provider;
- decrement the load by one load unit for the selected service provider;
- calculate a new availability for the selected service provider; and
- update the resource allocation matrix with the assignment update, the availability and the load in real-time without input from the selected service provider.

10. The system of claim 7, wherein the resource allocation and scheduler processor is configured to update the resource allocation matrix with the service capacity data in real-time.

11. The system of claim 7, wherein the determination further comprises comparing availability and load of the service providers.

* * * * *